(12) United States Patent
Schneebeli et al.

(10) Patent No.: US 8,010,627 B1
(45) Date of Patent: Aug. 30, 2011

(54) VIRTUAL CONTENT PUBLISHING SYSTEM

(75) Inventors: Scot L. Schneebeli, Overland Park, KS (US); Terry Lee Oehrke, Lee's Summit, MO (US); Scott Christopher Wells, Austin, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1376 days.

(21) Appl. No.: 09/160,424

(22) Filed: Sep. 25, 1998

(51) Int. Cl.
G06F 15/16 (2006.01)

(52) U.S. Cl. .................. 709/218; 709/225; 709/229

(58) Field of Classification Search .................. 709/201, 709/219, 226, 232, 218, 225, 229, 256; 707/201
See application file for complete search history.

(56) References Cited

U.S. PATENT DOCUMENTS

| | | | |
|---|---|---|---|
| 4,914,570 A | | 4/1990 | Peacock |
| 5,555,371 A | | 9/1996 | Duyanovich et al. |
| 5,592,626 A | * | 1/1997 | Papadimitriou et al. ...... 718/102 |
| 5,613,106 A | | 3/1997 | Thurman et al. |
| 5,644,766 A | * | 7/1997 | Coy et al. |
| 5,689,706 A | | 11/1997 | Rao et al. |
| 5,699,503 A | | 12/1997 | Bolosky et al. |
| 5,713,017 A | | 1/1998 | Lin et al. |
| 5,745,753 A | | 4/1998 | Mosher, Jr. |
| 5,751,955 A | | 5/1998 | Sonnier et al. |
| 5,765,171 A | | 6/1998 | Gehani et al. |
| 5,781,550 A | * | 7/1998 | Templin et al. |
| 5,781,912 A | | 7/1998 | Demers et al. |
| 5,794,253 A | | 8/1998 | Norin et al. |
| 5,806,075 A | * | 9/1998 | Jain et al. ...................... 707/201 |
| 5,815,668 A | | 9/1998 | Hashimoto |
| 5,819,263 A | * | 10/1998 | Bromley et al. |
| 5,838,894 A | | 11/1998 | Horst |
| 5,852,724 A | | 12/1998 | Glenn, II et al. |
| 5,867,667 A | * | 2/1999 | Butman et al. |
| 5,870,552 A | * | 2/1999 | Dozier et al. ................. 709/219 |
| 5,870,558 A | * | 2/1999 | Branton, Jr. et al. |
| 5,894,554 A | * | 4/1999 | Lowery et al. |
| 5,920,701 A | * | 7/1999 | Miller et al. |
| 5,948,108 A | | 9/1999 | Lu et al. |
| 5,950,198 A | | 9/1999 | Falls et al. |
| 5,961,602 A | * | 10/1999 | Thompson et al. |
| 5,974,563 A | | 10/1999 | Beeler, Jr. |
| 5,982,891 A | * | 11/1999 | Ginter et al. |
| 6,026,371 A | * | 2/2000 | Beck et al. ..................... 209/219 |
| 6,026,433 A | * | 2/2000 | D'Arlach et al. |
| 6,035,307 A | | 3/2000 | Martin et al. |
| 6,055,522 A | * | 4/2000 | Krishna et al. |
| 6,065,018 A | | 5/2000 | Beier et al. |
| 6,092,086 A | | 7/2000 | Martin et al. |
| 6,112,239 A | | 8/2000 | Kenner et al. |
| 6,115,035 A | * | 9/2000 | Compton et al. |
| 6,125,388 A | | 9/2000 | Reisman |

(Continued)

OTHER PUBLICATIONS

Veritas Software Corporation, "Veritas Storage Replicator for File Systems—White Paper," (Feb. 2, 1998).

(Continued)

*Primary Examiner* — Faruk Hamza
*Assistant Examiner* — Oleg Survillo

(57) ABSTRACT

A method and system for publishing network content is provided. Using an administrator interface, changes to content are made in a staging area. The staging area allows access to the remainder of the network for verifying links. Content is then published to a plurality of production areas in response to a single command.

4 Claims, 4 Drawing Sheets

U.S. PATENT DOCUMENTS

| | | | | |
|---|---|---|---|---|
| 6,134,584 | A * | 10/2000 | Chang et al. | 709/219 |
| 6,138,153 | A * | 10/2000 | Collins, III et al. | |
| 6,144,999 | A | 11/2000 | Khalidi et al. | |
| 6,182,111 | B1 * | 1/2001 | Inohara et al. | 709/219 |
| 6,185,598 | B1 * | 2/2001 | Farber et al. | |
| 6,199,082 | B1 * | 3/2001 | Ferrel et al. | |
| 6,202,093 | B1 * | 3/2001 | Bolam et al. | |
| 6,205,481 | B1 * | 3/2001 | Heddaya et al. | 709/226 |
| 6,208,986 | B1 * | 3/2001 | Schneck et al. | |
| 6,240,105 | B1 | 5/2001 | Zetts | |
| 6,247,141 | B1 * | 6/2001 | Holmberg | |
| 6,266,694 | B1 | 7/2001 | Duguay et al. | |
| 6,275,470 | B1 * | 8/2001 | Ricciulli | |
| 6,286,041 | B1 * | 9/2001 | Collins, III et al. | 709/218 |
| 6,292,787 | B1 * | 9/2001 | Scott et al. | |
| 6,314,463 | B1 * | 11/2001 | Abbott et al. | 709/221 |
| 6,324,182 | B1 * | 11/2001 | Burns et al. | |
| 6,331,983 | B1 * | 12/2001 | Haggerty et al. | 370/400 |
| 6,332,124 | B1 * | 12/2001 | Loch et al. | |
| 6,345,308 | B1 * | 2/2002 | Abe | |
| 6,345,316 | B1 * | 2/2002 | Chessell et al. | 719/330 |
| 6,421,652 | B2 * | 7/2002 | Loeb et al. | |
| 6,453,468 | B1 * | 9/2002 | D'Souza | |
| 6,564,216 | B2 * | 5/2003 | Waters | 707/10 |
| 6,618,751 | B1 * | 9/2003 | Challenger et al. | 709/213 |

OTHER PUBLICATIONS

Rdist Main Page, http://www.arachna.com/webservers/rdist-man.html (No Date).

Getting Started with PC—Rdist, http://www.pyzzo.com/pcrdist/1x/docs/start.shtml (No Date).

Helmer, et al., U.S. Appl. No. 09/160,389, filed Sep. 25, 1998.

Oehrke, et al., U.S. Appl. No. 09/021,466, filed Feb. 10, 1998.

* cited by examiner

VIRTUAL CONTENT PUBLISHING SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

This invention generally relates to computer networks. In particular, the invention relates to publishing content for use on Internet and intranet computer systems.

2. Description of the Prior Art

The Internet is an international network of interconnected government, education, and business computer networks. A person at a computer terminal or personal computer with the proper software communicates through the Internet by placing data in an Internet Protocol (IP) packet with an address for a particular destination on the Internet. Using Transmission Control Protocol (TCP), transport of packets is managed. Communication software on processors or routers on the intervening networks between the source (the user's network) and the destination network reads the address assigned to each packet and forwards the packets towards their destination.

Intranets are typically corporate networks that use the same networking or transport protocols as the Internet. Typically, dedicated servers provide access to corporate information in a cohesive fashion. For example, documents are stored in a HyperText Markup Language (HTML), and users of the intranet network use web browser software to obtain access to the documents. Thus, both the Internet and intranets can use IP.

Network access allows a user to gain access to various applications and related data. For example, a user with web browser software enters an address of a desired application. The address and the user's request for access is then routed through the IP network or a plurality of IP networks to a production server or processor at the requested address. Access is thus gained to the application. The user may then request further information such as an HTML document or further processing associated with the application. Using HyperText Transport Protocol (HTTP), HTML documents are communicated to the user. The documents or other application information that is provided comprise content, such as an Intranet web page, graphics or information representing various text and graphics associated with a company and its services.

Various groups provide the production servers and associated applications. For example, a corporation provides a production content server for providing information about that corporation to users through the IP network. Multiple production servers, each geographically remote to the other, may provide the same content for more efficient data retrieval.

The content is created using various software programs. Once created, an administrator manually provides a copy of the content to each of the production servers. After an administrator logs on to the production server (i.e. password verification), the content is published or made available to other network users and connected to the network for a first time. The administrator logs on to each production server and copies the content to each production server separately.

In some networks, the content is created or generated in the server that provides production content. For these systems, the administrator publishes the content by copying the content to a file for production. Some networks provide a separate staging area or server for the creation of content. The content is published to each production server by logging onto each production server and copying the content to each production server separately.

There are several problems with the publication processes discussed above. For example, write access to a production server for copying content may allow hackers to enter the production environment and cause damage. Any links to other sources of content may not be verified or tested until after the content is published or placed on the network. The publication process is manual. Various levels of administrator or content development access generally are not provided.

SUMMARY OF THE INVENTION

The present invention is defined by the following claims, and nothing in this section should be taken as a limitation of those claims. By way of introduction, the preferred embodiment of the present invention described below is directed to a system and method for publishing network content. According to one feature of the preferred embodiment of the invention, the administrator accesses only a staging area and publishes the content without accessing a production area, so write access to the production environment is not available. In a second feature of the preferred embodiment of the invention, the staging area is connected to the network, so the content may be verified or tested before the content is published or placed into production on the network. According to another feature of the preferred embodiment of the invention, various commands, such as scheduled publication commands, are provided as part of the staging area for automation of publication to one or more production servers. In yet another feature of the preferred embodiment of the invention, at least two levels of access are provided to access the staging area. For example, content developer and administrator access levels are provided. Therefore, the administrator can test the content and control publication, and the content developer can only create and edit content.

In a particular first aspect of the invention, a system and method for publishing network content is provided. The content is generated in a staging area. A publication command is received in the staging area, and, in response, the content is transferred to first and second production servers. The content is then provided in response to requests from the computer network from at least one server selected from the group consisting of: the first and second production servers.

In a second aspect of the invention, a method and system for publishing content on a computer network is provided. Access to the staging area is limited and comprises at least two access levels. Content is generated in the staging area, and the generation is restricted in response to a command associated with one of the at least two access levels.

In a third aspect of the invention, a method and system for publishing content on a computer network is provided. Staging and production areas are provided on the computer network. The staging area is associated with staging content, and the production area is associated with production content. The production content is replaced with the staging content in response to a publication command associated with the staging area. The staging content, now a second package of production content, in the production area is later replaced with the original production content in response to a rollback command associated with the staging area.

DETAILED DESCRIPTION OF PREFERRED EMBODIMENTS

Referring to FIGS. 1-4, networks with content publishing hardware and software are shown and include production and staging areas. The production areas may be more secure by limiting the areas and servers allowing write access. New or edited content may be published to one or multiple production servers in response to a command and without requiring a log on to each production server. The publication may be scheduled to occur at a future time or event. The publication may be rolled back by replacing the current production content with previous production content. At least two levels of access may be provided to better address development of content by third parties for use by the administrator of a company. For example, the administrator may freeze or prevent alteration of content in the staging area, and the content developer may not command publication. Furthermore, the staging area or service may be segmented to allow multiple user administrators or content developers to stage and publish content independent of each other using the same network resources.

The staging area may provide a centralized virtual network publishing house. Content may be developed, edited, proofed, reviewed and approved. The ability to freeze or block further modifications is provided. The development and editing is done in a secure environment with scheduled releases after approval. The content may be tested for interaction with the network, such as testing links. For release, the content is published to the network, similar to publishing newspaper or magazine content after secret development, editing and authorization. The published content may be recalled or replaced. Furthermore, a log of the various activities is recorded and may be accessed.

Figure 1:
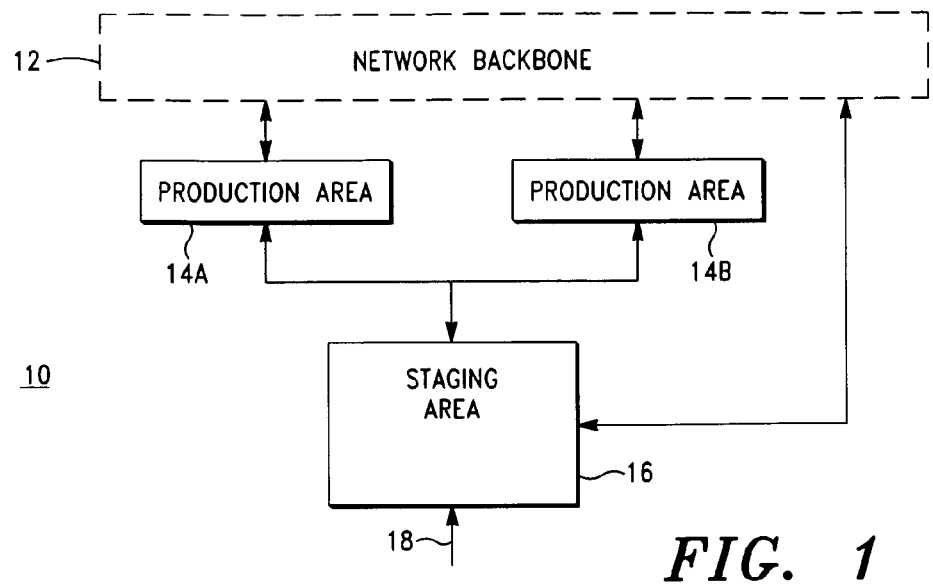
FIG. 1 is a schematic block diagram of one embodiment of a computer network for publishing content in accordance with the present invention.

Referring now to FIG. 1, a schematic depiction of one embodiment of a computer network for publishing content is shown generally at 10. Network 10 includes network backbone 12, production areas 14A, 14B and staging area 16. Production areas 14A, 14B and staging area 16 electronically connect to network backbone 12. Staging area 16 also electronically connects to each of the production areas 14A and 14B.

Network backbone 12 comprises one or more of various computer network components, such as routers, file servers, application servers, switches and connections. For example, network backbone 12 can comprise portions of an intranet or the Internet, such as one or more TCP/IP compliant networks. Other network architectures and protocols may be used. General access is provided to network backbone 12. General access includes: (1) public access, such as associated with the Internet, or (2) private access by a group, such as employees of a company or registered users. Users of the network backbone 12 generate requests, such as requests associated with content. For example, a user enters an address associated with Internet or intranet page content, such as a company home page or a list for company employees. The requests and responses are in any one of various formats, such as Simple Mail Transfer Protocol (SMTP), Network News Transfer Protocol (NNTP), HyperText Transfer Protocol (HTTP), Calendar Access Protocol (CAP), File Transfer Protocol (FTP), and Lightweight Directory Access Protocol (LDAP). Other TCP/IP formats or other protocols may be used. Using any of the various protocols, the request is routed to an appropriate production server. The production server provides the content in response to the request.

Each production area 14A and 14B comprises a source of content for responses to requests from network backbone 12. In one preferred embodiment, each production area 14A and 14B comprises at least one server and associated memory and software. Any one of various software may be used, such as Netscape Enterprise Web server software. Preferably, production area 14A is geographically remote from production area 14B, such as one production area in San Jose, Calif. and one in Relay, Md. More or fewer production areas in the same or different geographic locations may be used, and different hardware and software combinations may comprise each production area 14A and 14B. In one alternative embodiment, one server is segmented using software to provide two or more production areas 14. In yet another alternative embodiment, only one production area 14 is provided.

Production areas 14A and 14B provide production content. Production content comprises content accessible from network backbone 12, such as content provided to users with general access. The content is produced for distribution to any one or more members of a group. Production areas 14A and 14B provide the same production content in response to user requests. For example, content associated with "Company XYZ" is provided by each production area 14A and 14B. Each request is routed to one of production areas 14A and 14B.

Production content is generated off of network backbone 12 in staging area 16. Staging area 16 comprises a source of staging content for publication as production content. In one preferred embodiment, staging area 18 comprises a server and associated memory and software. The memory device may be shared with the production area memory. The software comprises Common Gateway Interface programs, associated daemons and other utilities for implementing the staging area 16 as discussed herein. For example, the Netscape Enterprise Servers software is modified to function with additional software to effect the processes discussed herein. Staging area 18 may comprise different hardware and software combinations.

Staging area 18 is geographically located with one of production areas 14A and 14B or remote from any production area 14. More staging areas in the same or different geographic locations may be used.

In one preferred embodiment, staging area 16 comprises a server segmented using software to provide two or more staging areas 18 for a plurality of users, such as "Company XYZ" and "Company ABC" users. The same server resource is used to generate content for a plurality of users, each user preferably independent of other users (i.e., without access to other segments). Non-segmented staging servers may be used.

Staging area 16 provides staging content. Staging content comprises content being generated for publication or availability as production content. The staging content is generated by creating the content using the staging area software discussed above or by copying or uploading a file. Using the staging area software or other software, the staging content may be generated by editing other staging or production content.

Users gain access to staging area 16 from network backbone 12 or limited access input 18. Preferably, access to staging area 16 is only provided through limited access input 18. Access may be limited to certain users, such as system administrators, and may include one or more levels of access.

Figure 2:
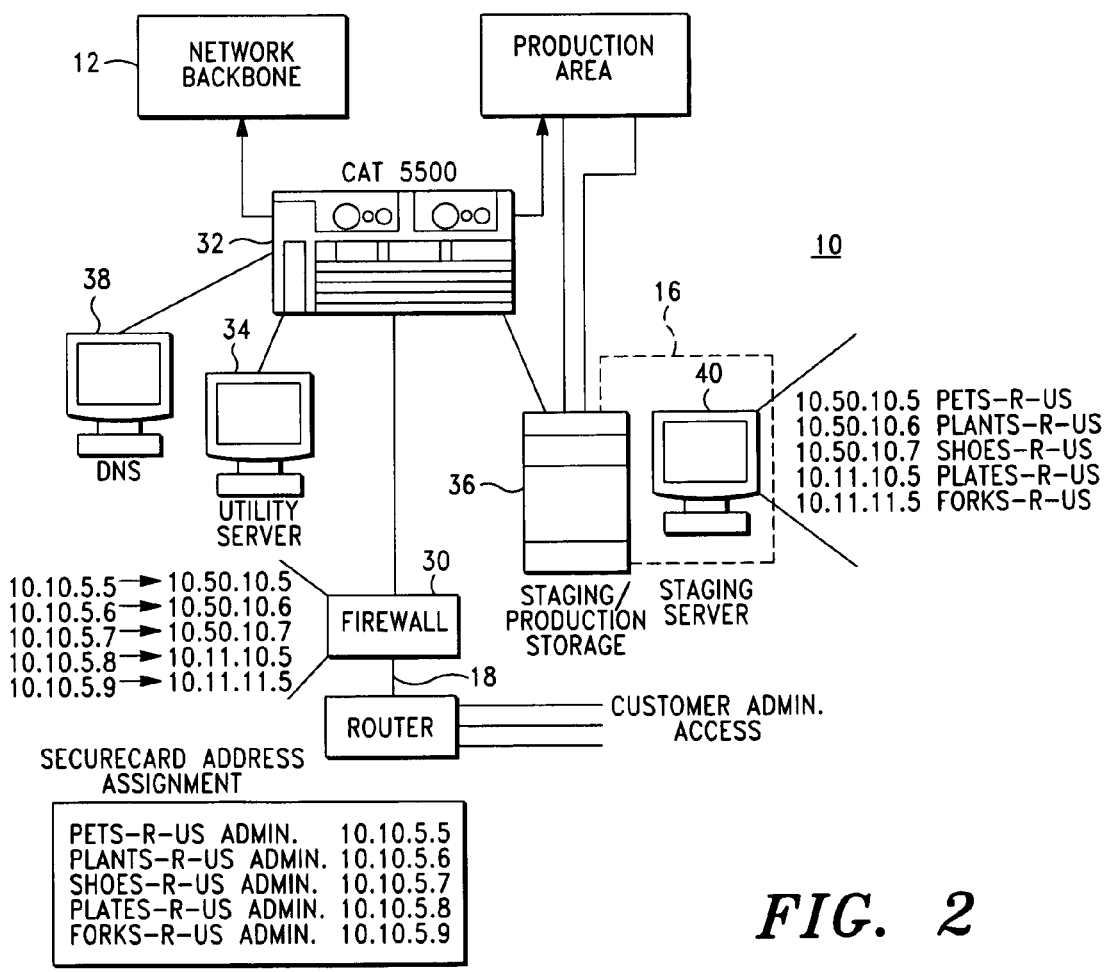
FIG. 2 is a schematic block diagram of another embodiment of a portion of a computer network for publishing content in accordance with the present invention.

Referring to FIG. 2, a schematic block diagram of one preferred embodiment of a portion of network 10 for publishing content with limited access to staging area 16 is shown. In this embodiment, limited access input 18 is established through firewall 30 as a connection to another processor or network. Firewall 30 is electronically connected to switch 32. Switch 32 connects with production area 14, network backbone 12, utility server 34, staging area 16, file server 36, and Domain Name Server 38.

File server 36 preferably comprises a device configured for the Network File System (NFS) standard and stores data associated with production area 14 and staging area 16. Switch 32 operates under the control of any one of various software applications, such as a Catalyst 5000 switch by CISCO, to transfer data among the various components of FIG. 2. Various transport formats, such as asynchronous transfer mode (ATM), Fiber Distributed Data Interface, or fast switched Ethernet formats, may be used. Preferably, a 100 Mb Ethernet transport format is used within a data center. Domain Name Server 38 preferably comprises a Sun Ultra 2 server (300 MHz, 256M Ram, two 2 GB drives and two Fast Ethernet Adapters). Production area 14 preferably includes a production server, and staging area 16 preferably includes a staging server 40. In one embodiment, the production server and staging server 40 comprise available network servers, such as Sun Ultra 2 servers (two 300 MHz, 512M Ram, two 2 GB drives and two Fast Ethernet Adapters) or SUN SPARC computer processors, each associated with a unique network address.

Utility server 34 in each of a plurality of data centers mounts available file servers 36. Utility server 34 provides a location in each data center for access to all customer data or content. Utility Server 34 hosts an Administration Interface (see server 52 of FIG. 3), e-commerce oriented servers, other servers, such as web servers, and operations. Utility server 34 also hosts a web server to allow user and network administration functions for correcting or diagnosing problems. Each data center is connected through a firewall, such as firewall 30, and Ethernet switches to other data centers. In one embodiment, the connection comprises a Virtual Private Network (VPN) connecting WAN segments of a network.

Firewall 30 preferably comprises a Sun Ultra 2 server (300 MHz, 256M Ram, two 2 GB drives and two Fast Ethernet Adapters running Raptor Eagle Software). Firewall 30 secures write access into network 10. Firewall 30 limits access by allowing only verified traffic and protocols to pass from the limited access input 18. For example, a user must enter an identification and a password for verification. In a preferred embodiment, each user is authenticated via an IP Security Encrypted Compliant Client (IPSEC). Other methods of verification may be used, such as automated or physical characteristic based methods. Access to staging area 16 may be limited to particular users, such as company administrators and content developers. Other users may be allowed access. Furthermore, firewall 30 preferably prohibits access associated with one segment from accessing any other segmented staging areas 16.

In this embodiment, the administrator or content developer may either log on to the network 10 at firewall 30 for access to staging area 16 or connect to production area 14 by generating a request from network backbone 12. Production area 14 and staging area 16 may be associated with a same address or domain name, such as 10.10.5.5 for "Company XYZ." With the same address, the administrator accesses the DNS 38 through firewall 30 to access the staging area 16. Based on the connection through firewall 30, DNS 38 establishes a connection with staging area 16. If the connection is not through firewall 30, the request for access is proxied out of firewall 30 to a DNS in network backbone 12 to establish a connection with production area 14.

In one embodiment, staging area users are associated with either dedicated or shared production and staging areas 14 and 16. The network provides a content hosting service for dedicated or shared services. Dedicated service provides a customer with a production server dedicated to the customer. Shared service provides the customer with one segment of a segmented production server. In this embodiment, dedicated customer administrators access their production area 14 and staging area 16 on the utility server 112, such as by accessing a web site hosted by utility server 112. Shared staging area administrators preferably use HTTP and FTP to access their staging area. Dedicated user administrators preferably use HTTP, FTP and Telnet to access their dedicated server and staging areas.

Referring to FIG. 1, after establishing a connection to staging area 16, the user generates staging content and publishes the staging content to production areas 14A and 14B. Staging area 16 is associated with a user interface corresponding to various publication activities.

Figure 3:
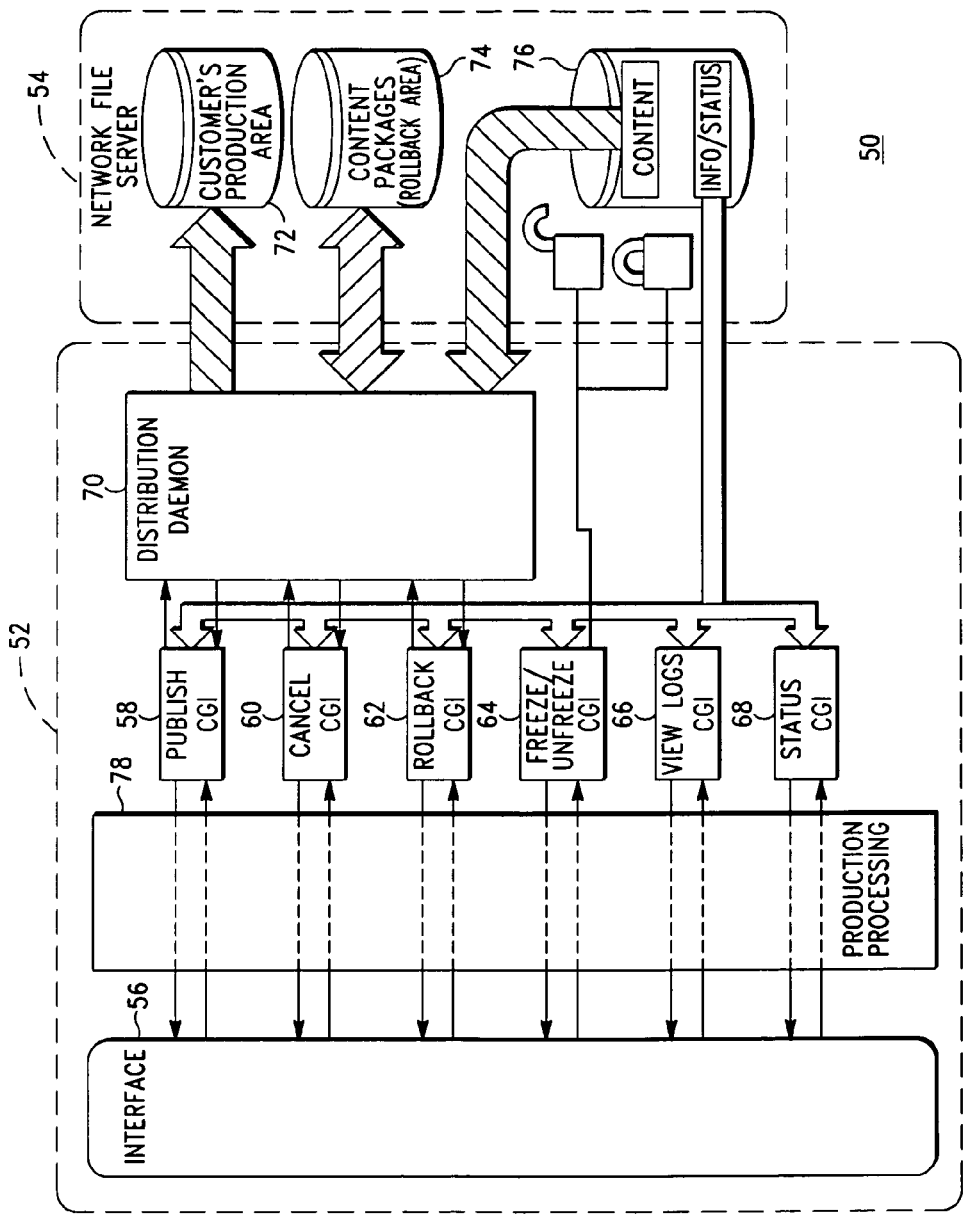
FIG. 3 is a schematic block diagram of one embodiment of a staging and production area of a computer network for publishing content in accordance with the present invention.

Referring to FIG. 3, a schematic block diagram of one embodiment of a computer network for publishing content is shown at 50. Network file server 54 includes staging and production file areas that are mounted on utility server 52. Utility server 52 accesses the production servers, staging servers, and rollback file areas, allowing access to needed data and distribution of data by a distribution daemon (packaging and distribution of customer content). Using the software discussed above, server 52 separately accesses data associated with the production and staging areas.

Server 52 and network file server 54 include user interface 56, various publication selections 58, 60, 62, 64, 66, and 68, distribution daemon 70, content rollback storage 74 and staging content storage 76. The production area includes an instance of Web server 78 (such as Netscape's Enterprise Web server for processing requests for HTML pages, CGI calls and other requests), distribution daemon 70 and production storage 72. Distribution daemon 70 routes content to designate the content as staging content (i.e., saves to the staging file area), production content (i.e., saves to the production file area), archived content (i.e., content associated with content rollback storage 74), and any timing information associated with the designation.

Publication selections 58, 60, 62, 64, 66 and 68 for generating commands associated with publication are presented on user interface 56. The publication selections include publish CGI 58, cancel CGI 60, rollback CGI 62, freeze/unfreeze CGI 64, view logs CGI 66 and status CGI 68. Fewer, more or different publication selections may be used. In a preferred embodiment, selection of any publication selection is determined by the users or may be selected in any order. Furthermore, user interface 56 provides other functions for publication, such as testing the staging content, various staging content generation aids, and other administrative functions.

Staging content is generated as discussed above. Upon creation or uploading, the staging content is stored in staging content storage 76. To aid creation, the staging area 16 may have user guides for a CGI library and links to other sites for information about Java scripts, Java applets, etc. Direct access to dedicated production servers allows dedicated staging or production area users to develop and run their own CGIs.

The staging content is generated by anyone with access to the staging area, such as the administrator or a content developer. After generation, a user associated with the administration level of access may freeze the staging content by selecting the freeze CGI 64. Freezing the staging content prevents editing or copying of data into staging content storage 76. During any subsequent review of the staging content, the content developer associated with the second level of access is prevented from or limited in editing or changing the staging content. To allow editing or changing the staging content, the administrator unfreezes the staging content by selecting unfreeze CGI 64. The Freeze CGI 64 may also be provided for staging areas 16 with public, one, or two or more levels of access.

The staging content is tested before publication to production. The staging content may be tested regardless of the status of freeze/unfreeze CGI 64. For example, the staging content for "Company XYZ" may provide a link or reference to content associated with "Doggie Treats" located on network backbone 12 (FIG. 1) or another production area. To test the interaction of the "Company XYZ" staging content with network backbone 12 or another production area, the staging area is electronically connected to network backbone 12. A request for content associated with the link is generated and transferred to network backbone 12. In one embodiment, the user accesses the staging area through firewall 30 (FIG. 2) so that this browser session is proxied through firewall 30. The user may access this staging area while still being able to follow any link to network backbone 12. An appropriate response verifies that the link functions correctly. The staging content is also displayed to the user to verify proper function.

The staging content may be published to production. The staging area user selects publish CGI 58. Preferably, only users associated with the administrator level of access may publish the staging content, but other levels of access could be used, such as allowing content developers to select some publishing related activities. In response to the selection, a publish command is generated.

In response to the publish command, distribution daemon 70 transfers the staging content to the production content storage. The transfer may comprise copying the staging content or designating the staging content file as production content files. For multiple production areas (see FIG. 1) for providing the same production content, distribution daemon 70 transfers a copy of the staging content to production content storage associated with each production area. For example, the staging content for any local (i.e., not geographically remote) production areas is transferred by designating the file as a production content file. For one or more remote production areas, a copy of the staging content is formatted for transfer over network backbone 12 or another connection and copied to the remote production content storage. In one embodiment, distribution daemon 70 is run in one production area but controls transfer to the multiple production areas associated with the content. In alternative embodiments, distribution daemon 70 runs on multiple utility servers 52 in a plurality of remote data centers to increase speed and provide fail-over. Using local data records, distribution daemon 70 determines appropriate data centers for providing content. The associated data files may be maintained by utility server 52 or incorporated into a relational database.

In one embodiment, the distribution daemon provides a publication command to a content replication process or daemon. The content replication daemon comprises a Perl script daemon, but other languages may be used. This embodiment preferably runs on a Unix system, but other systems may be used. The content replication daemon or other replication software may be implemented on utility servers 34 (see FIG. 2) at one or more associated data centers or on other servers, such as associated with production area 14 or staging area 16. Preferably, the content replication daemon is run on one utility server 34 associated with the data center for providing staging area 16. The content replication daemon generates a client process at each other data center.

Figure 5:
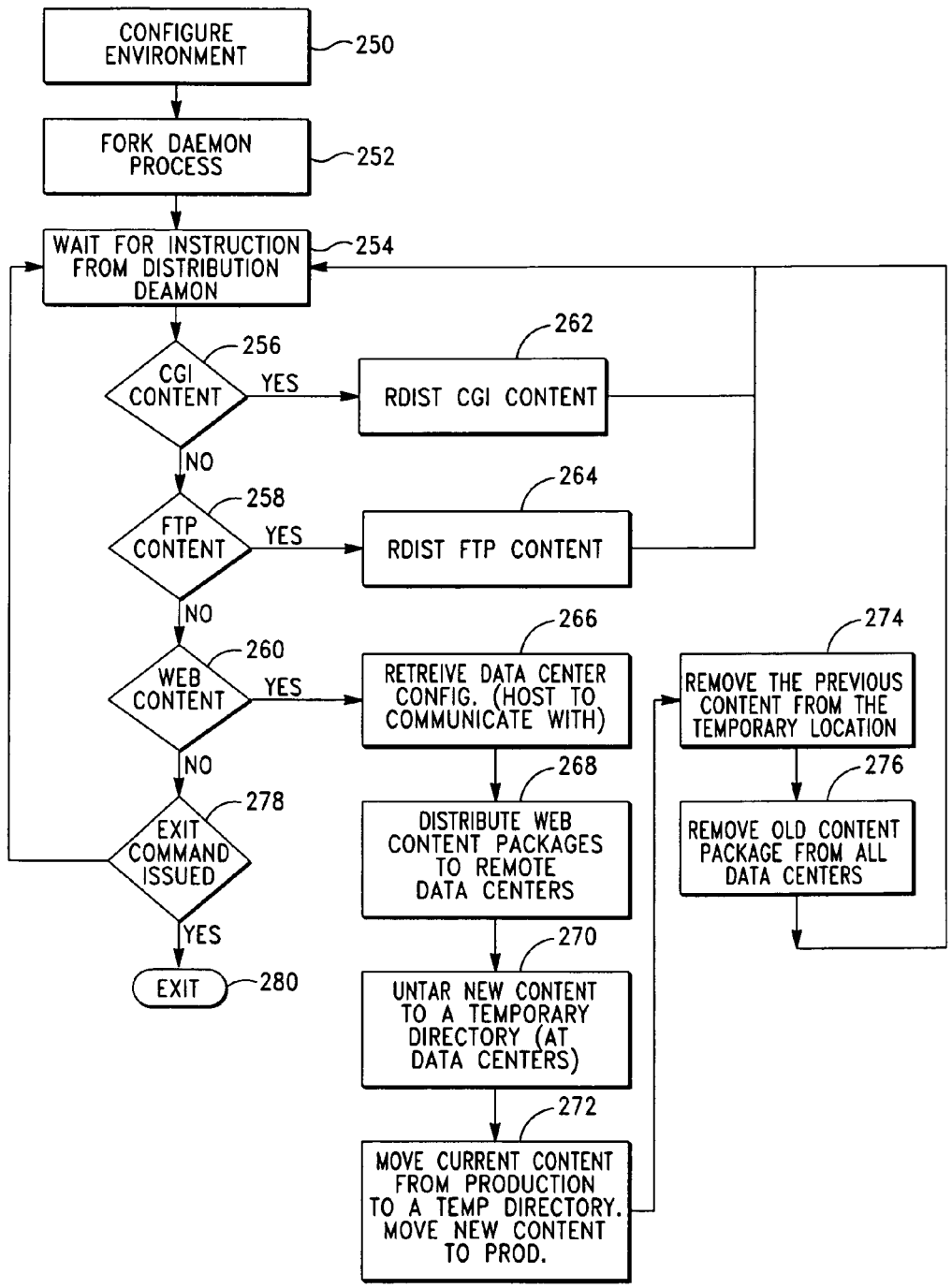
FIG. 5 is a flow chart representing one embodiment of a content publication method.

Referring to FIG. 5, a flow chart representing one embodiment of a content publication method is shown. The content is replicated to one or more production areas 14 (see FIG. 2). Preferably, the content is replicated substantially simultaneously to each production area 14.

For replication, content data is transferred to production areas 14. The content preferably is transferred to and copied in a plurality or all other appropriate production areas 14, but may be transferred to one or other subset of production areas 14. The content is transferred pursuant to the TCP/IP protocols, but other formats may be used.

Prior to publication, the content replication daemon executes various functions to enable replication. These enabling steps are performed once each time the system is turned on.

At step 250, the content replication daemon configures various environmental variables, such as customer or content provider variables. A file containing the hostname (i.e., the address) of each utility server 34 (see FIG. 2) associated with each production area 14 is also obtained. The content replication daemon also reads any command line arguments transferred to the content replication daemon.

The content replication daemon detaches from the UNIX file descriptors. At step 252, the content replication daemon is daemonized by creating a new process. The new process is disassociated from the existing process group and the standard UNIX file descriptors STDIN, STDOUT, and STDERR. The new process also disassociates from the controlling terminal.

At step 254, the content replication daemon enters a loop. The content replication daemon waits for a publish command from the distribution daemon. Alternatively, a terminate command is received and the processing ends after completion of any ongoing publication. In response to the publish command, various publication steps discussed below are performed.

For publication of content to multiple production areas in one or more data centers, content replication daemon checks for CGI content, FTP content, and Web content to be published in steps 256, 258, and 260, respectively. The content replication daemon may check for other types or groupings of content such as e-commerce files and access control files. Preferably, the check is performed by receiving a command to publish one or more types of content for a particular user. Alternatively, the types of content are sequentially checked. Regardless of the type of content, the content is published to multiple production areas substantially simultaneously. If publication to one or more production areas is not successful, the content replication daemon preferably withdraws the content from all the production areas as a rollback function. In alternative embodiments, publication to fewer than the designated production areas is allowed.

If CGI content exists for production, the content replication daemon copies or designates the CGI content for production and/or replicates the CGI content to other appropriate production areas in multiple data centers in step 262. Replication includes execution of a utility to move the content into production and ensure that proper permissions for reading, writing or executing a file are kept. In one embodiment, UNIX utility rdist version 6.1.3 from the University of Southern California moves the content into production in multiple production areas, but other software for designing files as production CGI content and/or copying files to production areas as production CGI content may be used. The other software may be UNIX based or operate with other systems. After publication of the CGI content, the content replication daemon returns to step 254.

If FTP content exists for production, the content replication daemon copies or designates the FTP content for production and/or replicates the FTP content to other appropriate production areas in multiple data centers in step 264. Replication includes execution of a utility to move the content into production and ensure that proper permissions are kept, such as the UNIX rdist discussed above. After publication of the FTP content, the content replication daemon returns to step 254.

If Web content exists for production, the content replication daemon copies or designates the Web content for production and/or replicates the Web content to other appropriate production areas in multiple data centers. Preferably, the Web content is replicated and placed in production at the same or a similar time at each production area. Placing the Web content into production at the same time in multiple production areas or data centers may minimize user down time and ensure availability of the same content if a production area fails.

In step 266, production area or data center configuration information is retrieved. The hostname (i.e., the address) of each data center or production area to which Web content is replicated is listed in a file. The content replication daemon obtains a copy of the file.

In step 268, copies of the Web content are replicated to each data center or production area. Replication includes execution of a utility to move the content into production and ensure that proper permissions are kept, such as the UNIX rdist discussed above.

The replicated Web content is extracted and stored in a temporary directory at each production area or data center in step 270. The Web content is extracted from an archive such as a TAR file or other. For TAR files, the files are unTARed for storage in the temporary directory.

The temporary directory allows control of the timing of production of the Web content. In alternative embodiments, the Web content is extracted and stored in a production directory (i.e., the content is placed in production).

In step 272, the content replication daemon copies the content into a production directory. Preferably, each production area or data center acknowledges copying the entire Web content file into the associated temporary directories before publication. The content replication daemon transfers the Web content into production substantially simultaneously at each production area or data center. Commands to place into production are broadcast to each production area or data center substantially simultaneously. As the new Web content is published, the Web content being replaced is stored in a temporary directory. Storage in the temporary directory allows backing out of publication and rolling-back to previous production content if an error is detected during any of the publication steps. Alternatively, the content is deleted.

In steps 274 and 276, the replaced Web content is removed from the temporary directory and other storage locations, respectively. Preferably, the replaced Web content is deleted at all but one production area or data center. The one production area or data center is preferably a data center or production area local to the staging area. This replaced Web content is stored in a rollback storage directory as discussed below. Preferably, the stored replaced Web content is bundled, such as by using TAR, and compressed. In alternative embodiments, the Web content is archived at each production area or deleted at all production areas. After step 276, the content replication daemon returns processing to step 254.

Preferably, any e-commerce content is published and backed up or stored like Web content. The CGI, FTP or access control files are not, but may be, stored for roll-back.

In addition to the publication commands discussed above, an exit command may be received by the content replication daemon. In step 278, the content replication daemon checks for the exit command. If an exit command is not received, the process returns to step 254. If an exit command is received, the content replication daemon ends processing in step 280.

Referring to FIG. 3, in a preferred embodiment, the transfer replaces previous production content. In this embodiment, the previous production content is stored in rollback content storage 74 in network file servers 54 at each data center. Storage may be implemented by a transfer, copy or designation of the previous production content file.

Publish CGI 58 preferably provides a schedule selection. The staging content is scheduled for transfer or publication at a future time or event. The staging content is consolidated into an archive package. The archive package is stored in rollback content storage 74 for future publication. When the scheduled time or event occurs, distribution daemon 70 transfers or publishes the archived package of staging content to the production area or areas.

Selection of cancel CGI 60 allows the staging area users to cancel a scheduled publication. For example, the administrator for "Company XYZ" schedules staging content reflecting an advertisement for a sale for publication to production content in 10 days. Before the scheduled 10 days, the shipment of products for the sale is destroyed. The administrator cancels publication in order to avoid advertising the sale.

Selection of rollback CGI 62 allows the exchange of content. For example, a sale commences after 10 days and lasts for 4 days. The production content in the production area is replaced by the staging content associated with the sale at day 10. This first production content is archived in rollback storage area 74. At day 14, the sale ends. In response to a rollback command from rollback CGI 62, the current production content (the previous staging content) is replaced by the original production content. In alternative embodiments, the staging area user selects from multiple previous production content files stored in rollback content storage 74 to replace the current production content. Any one of various archive packages may be selected for publication on one or more production areas. In other embodiments, the staging area user selects different archive packages of content for regional distribution or publication. Rollbacks are preferably not, but may be, scheduled.

Selection of view logs CGI 66 provides the staging area user with log files of actions taken in the staging area or associated production areas. Selection of status CGI 68 provides the staging area user with the current memory and processor bandwidth availability and other network status information for either or both of the production and staging areas.

After publication to the production areas, web server 78 provides the production content in response to requests from network backbone 12. The web server 78 obtains the production content from production content storage 72.

Figure 4:
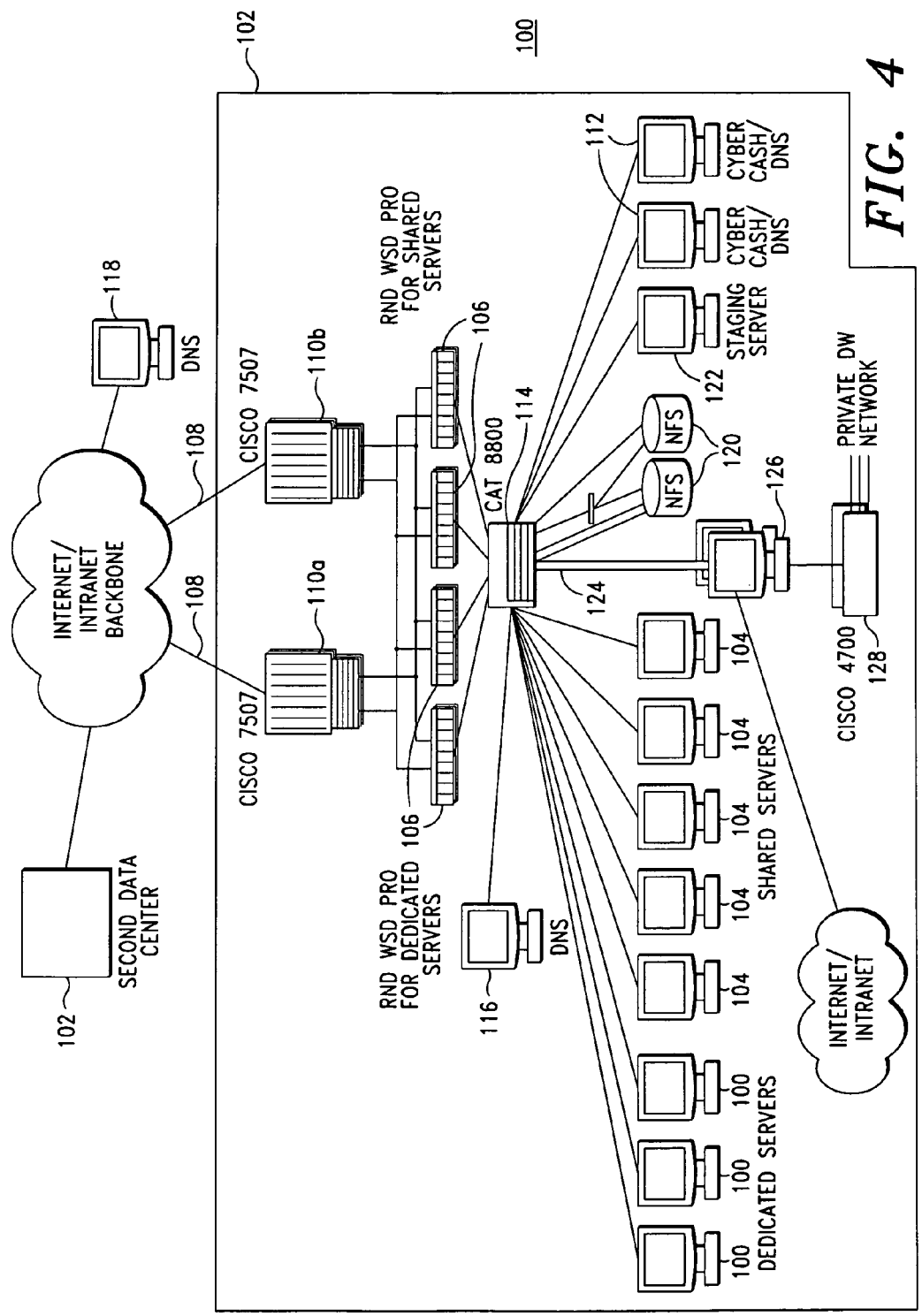
FIG. 4 is a schematic block diagram of an alternate embodiment of a computer network for publishing content in accordance with the present invention.

Referring to FIG. 4, a schematic block diagram of an alternative preferred embodiment of a computer network for publishing content is shown at 100. Network 100 is described in U.S. patent application Ser. Nos. 09/021,466 and 09/021,091, filed Feb. 10, 1998, the disclosures of which are incorporated herein by reference herein. Network 100 includes two or more data centers 102. While only one data center 102 is shown in detail, second data center 102 and further data centers preferably comprise the same components. The architecture provides a content hosting service for dedicated or shared services. Dedicated service provides a customer with a server 100 in each data center 102. Shared service places the customer application or production content on ten production servers 104, five in each of two data centers 102, with RND WSD Pro boxes (load balancers) 106.

Preferably, the data center architecture provides redundant equipment setup to failover automatically in a matter of seconds. Traffic is evenly distributed, such as half on each of two connections 108 coming into data center 102. Thus, router 110a processes half the requests associated with IP addresses in data center 102 and router 110b processes the other half. Using Border Gateway Protocol, version 4 (BGP4) in the network, if one of routers 110a or 110b fails, BGP4 routes the traffic to the surviving connection 108.

Preferably, routers 110 comprise Cisco 7507 Routers (128 MB DRAM, SONET, Serial Card & Fast Ethernet Cards). Two 7507 routers 110 connect to four RND WSD Pro boxes 106. If one of the RND boxes 106 that supports the dedicated servers 100 fails, routers 110 access the redundant RND box 106 for transfers with the dedicated servers 100.

Routers 110 preferably include two router ports that support the shared production servers 104. Routers 110 access a list to deny transfer of requests other than HTTP port 80 and port 443 (SSL) requests addressed to a specific range of registered IP addresses denoting shared production servers 104 in data center 102. Two router ports support the dedicated production servers 100. Routers 110 access a list to deny transfer of requests other than HTTP port 80, port 443 (SSL) and FTP ports 20 and 21 request addressed to a specific range of registered IP addresses denoting dedicated production servers 100 in data center 102.

The RND WSD Pro boxes 106 intelligently direct IP requests to the most appropriate production server 100 or 104. The method of directing is preferably fully configurable, such as the method and system disclosed in U.S. application Ser. No. 09/021,091, referenced above.

In this embodiment, the registered IP address of the shared and dedicated customer sites on the appropriate production server 100 or 104 resides on WSD Pro boxes 106. Each customer (i.e., user group or network service provider customer) has two registered IP addresses, one for each data center 102. As requests enter into one of the data center WSD Pro boxes 106, the RND Pro box 106 accesses the availability of the shared or dedicated production servers 100 or 104 within that data center 102 as well as the other data center 102. If the production servers 100 or 104 in the local data center 102 are unavailable, the request is redirected to the other registered IP address at the other data center 102.

Where the customer's application content is included on shared production servers 104, five shared production servers 104 at each data center 102 may accept any request for any shared customer site. A request may be redirected to the other data center 102 if all the shared production servers 104 are down at the current data center 102.

The RND boxes 106 provide internal traffic load balancing and failover. The internal load balancing/failover feature is used for traffic being sent from the production servers 100 or 104 to the CyberCash servers 112. If one of the unregistered CyberCash servers 112 fails, RND boxes 106 route all CyberCash traffic to the surviving CyberCash server 112.

Connected to RND boxes 106 is Cisco Catalyst 5500 (Dual Power Supply, 2 Supervisor Modules, 8 Fast Ethernet Modules) switch 114. Catalyst 5500 switch 114 is a high-speed internally redundant network switch that supports virtual LANs. This network device segments traffic to keep production Internet traffic from the back-end management network (e.g., back-end components and connections of servers 100, 104, 120, 122, 112). Catalyst 5500 switch 114 has redundant power supplies and redundant management modules. If either the power supply or the management module fails, the redundant device may be processing within 60 seconds. During this 60 second window, RND WSD Pro boxes 106 automatically route traffic to the other data center 102.

To provide a more redundant environment, shared production servers 104 connect to separate interface cards on the Catalyst 5500 switch 114. If an interface card malfunctions, the shared pool of production servers 104 are still accessible. RND WSD Pro boxes 106 automatically take shared production servers 104 connected to the failed card out of the shared server pool. These shared production servers 104 are added to the pool as soon as the card has been replaced.

Preferably, each dedicated production server 100 comprises a Sun Ultra 2 server (300 MHz, 256M Ram, two 2 GB drives and two Fast Ethernet Adapters). Each dedicated customer application has a dedicated production server 100 in two data centers 102, such as a data center in San Jose, Calif. and one in Relay, Md. Each dedicated production server 100 has two Fast Ethernet adapters. One of the Fast Ethernet adapters acts as the front-end Internet access. This adapter is associated with a private unregistered address and allows transfer of HTTP and FTP protocol formatted data. This adapter preferably may not allow logging on into the production server 100. The other adapter connects to a private management network. This adapter is used for data access and operational control.

Transfers to dedicated production servers 100 are routed through a separate port on routers 110 and utilize a separate group of RND WSD Pro boxes 106. This segmentation provides an extra level of security by only allowing FTP requests to be sent to the dedicated production server network.

Preferably, each dedicated production server 100 runs two instances of Netscape Enterprise Server. One is used for production access from the Internet (only accessible from the front-end Fast Ethernet adapter) and the other is used as the staging area for pre-production work (only accessible from the back-end network).

The administrator for dedicated production servers 100 accesses the back-end network via the back-end firewall 126. Back-end DNS 112 points to the staging area so the administrator may see their new site prior to moving the site into production. For the administrator to view the production site, access to the site is provided through the Internet. Since the staging area and the production area have a same domain name, the administrator accesses a specific back-end DNS 112 that points to the staging area.

Server and application configuration and log files are stored on Auspex NFS servers 120 within data center 102. If a dedicated production server 100 fails, a spare dedicated production server 100 is installed on the network and loaded using Jumpstart. Since the production server 100 and application and log files are kept on the Auspex NFS servers 120, the spare dedicated production server 100 assumes operation without having to manually reconfigure the application.

Preferably, shared production servers 104 comprise Sun Ultra 2 devices (two 300 MHz, 512M Ram, two 2 GB drives and two Fast Ethernet Adapters). In one embodiment, five shared production servers 104 support 175 customer sites. Each shared production server 104 supports 35 average customer sites, but more or fewer sites may be supported. With the load balancing capability of RND WSD Pro boxes 106, the request load is generally evenly distributed across the shared production servers 104 in the shared pool. Since the two data centers 102 provide geographic memory mirroring, the 175 customer sites are distributed across 10 shared production servers, five in each data center 102.

Each shared production server 104 has an IP or other address associated with the production side interface and 175 virtual IP addresses bound to it. Each customer web server software is bound to one of the virtual IP addresses.

In one embodiment, shared production servers 104 are not accessible by the shared customer administrators. The shared customer administrators have access to a shared staging server 122. Due to memory usage, security and any effect on other customers, the shared customers have read access to a library of programs which implement Computer Generated Interfaces (CGIs). To conserve memory, each shared production server 104 runs Netscape Enterprise Server in software virtual server mode. This mode uses data from the CGIBIN and spawns server threads only when needed. Each server thread uses roughly 3 to 4M of memory.

Alternatively, for CyberCash processing, shared customers run as a separate server instance. This allows customers to have a separate read-only CGIBIN.

If a shared production server 104 fails, RND WSD Pro boxes 106 remove the production server 104 from the available shared pool. The failed server 104 is then repaired and connected to the network. Using a Jumpstart server, the repaired shared production server 104 is loaded. Since the configuration and log files are stored on the Auspex NFS servers 120, the system begins processing from where it left off without manual reconfiguration.

NFS Servers 120 preferably comprise Auspex NS7000 servers. NFS servers 120 may provide fault tolerance, high availability, survivability and scalability in a storage system. Each data center 102 includes a pair of NFS servers 120 for storing the production and staging area content, log files and local server 100, 104, 122, 112 configurations.

Staging server 122 comprises Sun Ultra 2 servers (two 300 MHz processors, 512M Ram, two 2 GB drives and two Fast Ethernet Adapters). Staging server 122 provides a staging site for shared customers.

Preferably, staging server 122 supports about 75 customers. Shared customers review their staging content as processed by staging server 122 prior to publishing the staging content to the production server 104. With multiple company sites running on the shared pool of production servers 104, non-production corporate information remains secure. Access to shared production servers 104 may not be directly provided to customers. Access to these production servers 104 is provided for the back-end operational group. Other security processes may be used.

When a customer administrator accesses data center 102, firewall 126 allows the customer administrator to send information to their staging server IP address, access the administration site and receive information from back-end DNS 116. Firewall 126 prohibits them from hitting any other staging areas or any other servers 100, 104, 112 on the back-end network.

Dedicated customer administrators access their production server IP address and the administrator site on the utility server 112. Direct access to their production server 100 allows them to develop and run their own CGIs. This administrator staging area on staging server 122 also links to the customers monitoring information. This information informs them how much disk space is used, how much transfer has been used, a number of hits, etc. This administrator site also has user guides for the CGI library and links to other sites for information about Java scripts, Java applets, etc.

To conserve memory and since a shared CGIBIN is used for shared customers, Netscape Enterprise Server is run in the software virtual servers mode. Alternatively, the shared staging servers 122 run Netscape Enterprise Server as a separate instance, providing a separate CGIBIN for each customer. Staging server 122 mounts customer staging content from NFS servers 120.

As an alternative to providing customer administrator access to staging servers 122 in both data centers 102, customer administrators are allowed access to one staging server 122, such as the San Jose staging server. Staging server information is backed-up in the San Jose data center in case of loss of the San Jose data center 102. If the San Jose data center 102 is down for an extended length of time, the DNS entry for the proxy firewalls on the back-end network changes to point to the firewalls in the other data center 102, such as the Relay data center and the staging back-ups are provided to the Relay data center 102. The one staging area publishes staging content to all the appropriate production areas, such as in both data centers 102.

To publish content to appropriate production areas, the staging area user interface and associated methods described above are used. For example, the interface and selection described with reference to FIG. 3 are used.

CyberCash/DNS Servers 112 preferably comprise Sun Ultra 2 servers (300 MHz, 256M Ram, two 2 GB drives and two Fast Ethernet Adapters). Preferably, two CyberCash/DNS servers 112 are provided at each data center 102. The CyberCash/DNS servers 112 process CyberCash/DNS requests. The two CyberCash/DNS servers 112 are load balanced by RND WSD Pro boxes 106. The back-end DNS 116 has one 10. address load balanced across the two virtual 10. addresses of the actual DNS application on the CyberCash/DNS servers 112. The CyberCash application is load balanced in the same manner as the DNS servers 112 (CyberCash and DNS functions are performed by the same servers 112). Each shared and dedicated production server 100 and 104 uses one 10. address for CyberCash. If one of the CyberCash/DNS servers 112 goes down, RND WSD Pro boxes 106 route traffic to the surviving CyberCash/DNS server 112. CyberCash requires communication with various financial institutions on the Internet.

Therefore, requests from CyberCash servers 112 to the Internet are routed through the back-end interface and are proxied by the firewall 126.

Firewall server 126 preferably comprises a Sun Ultra 2 server (300 MHz, 256M Ram, two 2 GB drives and two Fast Ethernet Adapters running Raptor Eagle Software). In one embodiment, two firewalls 126 are provide at each data center 102 and secure write access into their data center 102. Anyone that has access to data centers 102 passes through one of the two firewalls 126. Preferably, there are five connections to each firewall 126: one from an operations network, one from the back-end network, one from the Internet (proxy access from staging server 122 to verify links on the customers staging web sites), one from a private production network, and one from a private back-end management network.

The operations network connected to firewalls 126 is an inbound only port. Firewall 126 allow traffic and protocols to pass from the operations network into data center 102 but block traffic from data center 102 into the operations network.

The back-end network connection comprises an inbound only port. Customer administrators access the data center through this port. Firewall 126 acts as a proxy server to the customer administrators. Once the shared customer administrators successfully enter their user-id and password, firewall 126 allows them to access the IP address of their staging area and DNS servers 112 selected by firewall 126. If the DNS entry is not found in the back-end data center DNS 116, the request is proxied out of firewall 126 to a DNS in the Internet. Thus, the customer administrators access the Internet for reference information as well as to verify their links. As discussed above, more than one level of access may be provided.

Dedicated customer administrators preferably use HTTP, FTP and Telnet to access their dedicated server 100 as well as the administrator site on the staging server 122. The shared customer administrators preferably use HTTP and FTP to access their staging site and the administrator site.

The Internet port is preferably for outbound traffic and firewall 126 proxies requests from data center 102 to the Internet through that port. The only inbound traffic is traffic initiated from within data center 102.

Half of the customer administrators proxy to one of the firewalls 126, and the other half proxy to the other firewall 126. Alternatively, one firewall 126 processes substantially all of the requests, and the other firewall 126 acts as a standby. If one of firewalls 126 fail, the other firewall 126 has the same configuration for processing requests associated with all the customer administrators.

Data centers 102 preferably include two Cisco 4700 Routers 128 (64M DRAM, 4 port Serial, 6 port Ethernet). Cisco 4700 routers 128 process the back-end connections. Preferably, three DS1 lines from the back-end network from each data center connect to routers 128. Two DS1 lines connect to one of the 4700 routers 128 and the other DS1 line connects to the other 4700 router 128 for failover.

As information associated with a customer site is developed, the information is archived. With two NFS servers 120 having mirrored data at each data center 102, there are 4 copies of the same data. Generally, the production data is not backed up or archived.

The data is backed up periodically, such as every night with a nightly rotation of partial full (full backup of part of the data) and incremental back ups. Due to the large amount of data, a seven day rotation for full back up of portions of the data is preferably used. Preferably, seven groups of file systems are identified and each group is fully backed up once a week on alternating nights. On any given night, the remaining groups are incrementally backed up.

It should be understood that many changes and modifications can be made to the embodiments described above. For example, different publication commands and associated processes may be used to assist in publication. More than two or only one production area may be provided. More than two or only one level of access to any staging area or back-end area may be provided. It is therefore intended that the foregoing detailed description be understood as an illustration of the presently preferred embodiments of the invention, and not as a definition of the invention. It is only the following claims, including all equivalents, that are intended to define the scope of the invention.

The invention claimed is:

1. A system for publishing content on a computer network, the system comprising:

a staging server and associated software comprising a staging area on the computer network, the staging area operable to allow generation, editing and/or testing by an administrator of staging content and transfer of the staging content from the staging area to a plurality of production areas for publication on the production areas at substantially the same time, wherein the transferred staging content published on each of the production areas is the same staging content;

a firewall operable to limit access to the staging area to at least two access levels such that the staging area is not accessible by content users of the computer network, the firewall operatively connected to the staging server, and wherein a first user associated with a first of the at least two access levels is allowed to control generation, editing and/or testing of the staging content, and wherein a second user associated with a second of the at least two access levels is allowed to control transfer of the staging content from the staging area to the production areas.

2. The system of claim 1 further comprising a production server associated with production content; and wherein the production content is replaced with the staging content associated with the staging area and the replacement is reversed at a later time.

3. The system of claim 1 wherein the software comprises segmented software; and the each segment of the segmented software is associated with one of a plurality of user groups.

4. The system of claim 1 further comprising a user interface associated with selections for at least two actions selected from the group consisting of:

testing the interaction of the staging content with the computer network from the staging area;

scheduling a transfer of the staging content to a first production server and a second production server;

canceling said scheduled transfer;

transferring the content to the first production server and the second production server in response to a publish command;

replacing production content on the first production server and the second production server with prior production content, the prior production content comprising content previously on the first production server and the second production server;

providing information selected from the group consisting of: log files, status information and combinations thereof.

\* \* \* \* \*